United States Patent
Rhodes et al.

[19]

[11] Patent Number: 5,979,548
[45] Date of Patent: Nov. 9, 1999

[54] HEAT EXCHANGER HAVING HEAT EXCHANGE TUBES WITH ANGLED HEAT-EXCHANGE PERFORMANCE-IMPROVING INDENTATIONS

[75] Inventors: Richard O. Rhodes, San Francisco; William W. Alston, Sunnyvale, both of Calif.

[73] Assignee: FAFCO, Inc., Redwood, Calif.

[21] Appl. No.: 08/774,066

[22] Filed: Dec. 23, 1996

[51] Int. Cl.[6] .................................................. G05D 23/12
[52] U.S. Cl. ........................... 165/284; 165/103; 165/132; 165/177; 165/905; 132/512.1; 132/543.15
[58] Field of Search ..................................... 165/132, 177, 165/283, 284, 905, 103; 126/400; 137/512.1, 543.15, 495

[56] References Cited

U.S. PATENT DOCUMENTS

| | | |
|---|---|---|
| 1,129,072 | 2/1915 | Conn ................................ 137/543.15 X |
| 2,252,045 | 8/1941 | Spanner ............................... 165/177 X |
| 2,310,970 | 2/1943 | Limpert . |
| 3,272,961 | 9/1966 | Maier, Jr. et al. . |
| 3,779,312 | 12/1973 | Withers, Jr. et al. . |
| 3,840,175 | 10/1974 | Jacuzzi ................................. 165/284 X |
| 3,920,067 | 11/1975 | Schindler et al. ....................... 165/283 |
| 4,044,797 | 8/1977 | Fujie et al. . |
| 4,080,703 | 3/1978 | Beck, Jr. . |
| 4,088,183 | 5/1978 | Anzai et al. ......................... 126/400 X |
| 4,248,179 | 2/1981 | Bonner . |
| 4,284,068 | 8/1981 | Gunderson . |
| 4,314,587 | 2/1982 | Hackett . |
| 4,402,914 | 9/1983 | Eckhoff . |
| 4,679,617 | 7/1987 | Keldmann . |
| 4,706,650 | 11/1987 | Matzkanin . |
| 4,923,004 | 5/1990 | Fletcher et al. ......................... 165/175 |
| 4,926,933 | 5/1990 | Gray ........................................ 165/173 |
| 4,995,450 | 2/1991 | Geppelt et al. . |
| 5,052,476 | 10/1991 | Sukumoda et al. . |
| 5,109,920 | 5/1992 | Merryfull ................................ 165/163 |
| 5,186,250 | 2/1993 | Ouchi et al. . |
| 5,195,240 | 3/1993 | Shuster et al. . |
| 5,239,839 | 8/1993 | James . |
| 5,271,376 | 12/1993 | Lu et al. .............................. 165/177 X |
| 5,408,965 | 4/1995 | Fulton et al. . |

FOREIGN PATENT DOCUMENTS

| 400513 | 10/1933 | United Kingdom .................. 165/177 |
| 862458 | 3/1961 | United Kingdom .................. 165/177 |

OTHER PUBLICATIONS

Fafco, "Sunsaver ™" Solar Heating System for Above Ground Pools.

Sun–Swim™, A Product of Aquatherm Industries, Inc., Pt. No. 19462 © 1994 Aquatherm Industries, Inc.

*Primary Examiner*—Allen Flanigan
*Attorney, Agent, or Firm*—Beyer & Weaver, LLP

[57] ABSTRACT

Disclosed is a heat exchange tube having angled heat-exchange performance-improving indentations on the tube. These angled performance-improving indentations increase the amount of heat transferred to a heat exchange liquid flowing through the tubes without substantially increasing the pressure drop or reducing the flow rate of the heat exchange liquid through the tube. An array of tubes can be made using heat exchange tubes of this invention, and a heat exchanger can be formed from an array or from tubes of this invention. In certain preferred embodiments, heat exchangers of this invention are particularly well-suited for use in solar-heating swimming-pool water or for use in thermal energy storage units.

4 Claims, 9 Drawing Sheets

HEAT EXCHANGER HAVING HEAT EXCHANGE TUBES WITH ANGLED HEAT-EXCHANGE PERFORMANCE-IMPROVING INDENTATIONS

FIELD OF THE INVENTION

The invention provides heat exchange tubes and heat exchange systems that incorporate those tubes. The heat exchange tubes of this invention are particularly suited for use in solar-heating systems for swimming pools and for thermal energy-storage units, as well as for liquid to air and liquid to liquid heat exchangers.

BACKGROUND

Swimming pools require a large amount of heat to maintain the water in the pool at a temperature that is comfortable for swimming. Many people utilize solar heating systems to provide at least a portion of the heat that is needed to keep the water temperature at a comfortable level throughout the seasons.

One solar heating system that has been very successful in capturing solar heat and converting that heat into warmed water comprises an array of heat exchange tubes made of a dark, thermoplastic material. The array is typically mounted on the roof of a building near the pool, and pool water is circulated through the array using the centrifugal pump that also pumps water through the pool filter. The dark color of the thermoplastic tubes assures high absorption of solar heat.

Because there is little solar energy per square foot of surface area, an array of heat exchange tubes must have a large surface area to capture useful amounts of heat. Thus, an array of heat exchange tubes is usually wide and long, stretching in some instances from the bottom of the roof on which it is mounted to the top of the roof, and the array usually has thousands of small diameter tubes arranged in parallel and through which the pool water flows. The large number of tubes provides a large surface area that absorbs solar energy.

In typical solar panels, water flows in parallel through a large number of tubes, which causes low flow velocity. Flow within each tube is consequently laminar and not turbulent. Laminar flow does not promote good heat exchange between the fluid and the tube wall, but it is desirable to maintain a low flow rate through the tubes rather than increasing the flow rate to provide turbulence. More energy is lost to friction when flow is turbulent instead of laminar, and consequently pumping costs increase as flow becomes turbulent. Thus, it is desirable to maintain laminar flow in order to keep pumping costs low.

It is also very desirable to increase the amount of solar energy transferred into pool water per unit area of exposed array area, so that the array can be made smaller or the dependence on other heat sources such as natural-gas heaters can be further reduced or eliminated. It is therefore one object of the invention to provide a thermoplastic heat exchange tube or array that has improved heat transfer to the fluid flowing through the tube or array. It is another object of the invention to increase the heat transfer while not increasing the pressure drop substantially through a tube or array. It is another object to increase the amount of heat transferred for a given flow rate through a tube or array. These and other objects and advantages are apparent from the discussion herein.

SUMMARY OF THE INVENTION

The invention in one embodiment comprises a heat exchanger having an array of a plurality of heat exchange tubes, which tubes have angled heat-exchange performance-improving indentations. This heat exchanger is capable of transferring more heat than an identical heat exchanger without angled performance-improving indentations, especially when the liquid is flowing through its tubes in laminar flow. In a preferred embodiment of the invention, the pressure drop and flow rate remain substantially the same in the two heat exchangers. In certain preferred embodiments, the heat exchanger is particularly suited for use in solar-heating swimming pool water. In other preferred embodiments, the heat exchanger is well-suited for use in a thermal energy storage unit, which can shift power demand or load to off-peak hours and reduce the cost of supplying cool air to an office building, for example. The heat exchanger may also be used, for example, as an air to water or water to water heat exchanger. In another preferred embodiment, the heat exchanger is equipped with a pressure regulating valve as described below.

Among other factors, this invention is derived from the technical finding that thermoplastic heat exchange tubes having angled performance-improving indentations as described herein provide substantially improved heat exchange to a liquid such as swimming pool water in laminar flow through the tubes without substantially increasing the pressure drop through the array of tubes. Other technical findings and advantages are apparent from the discussion herein.

DETAILED DESCRIPTION OF THE PREFERRED EMBODIMENT

Figure 1:
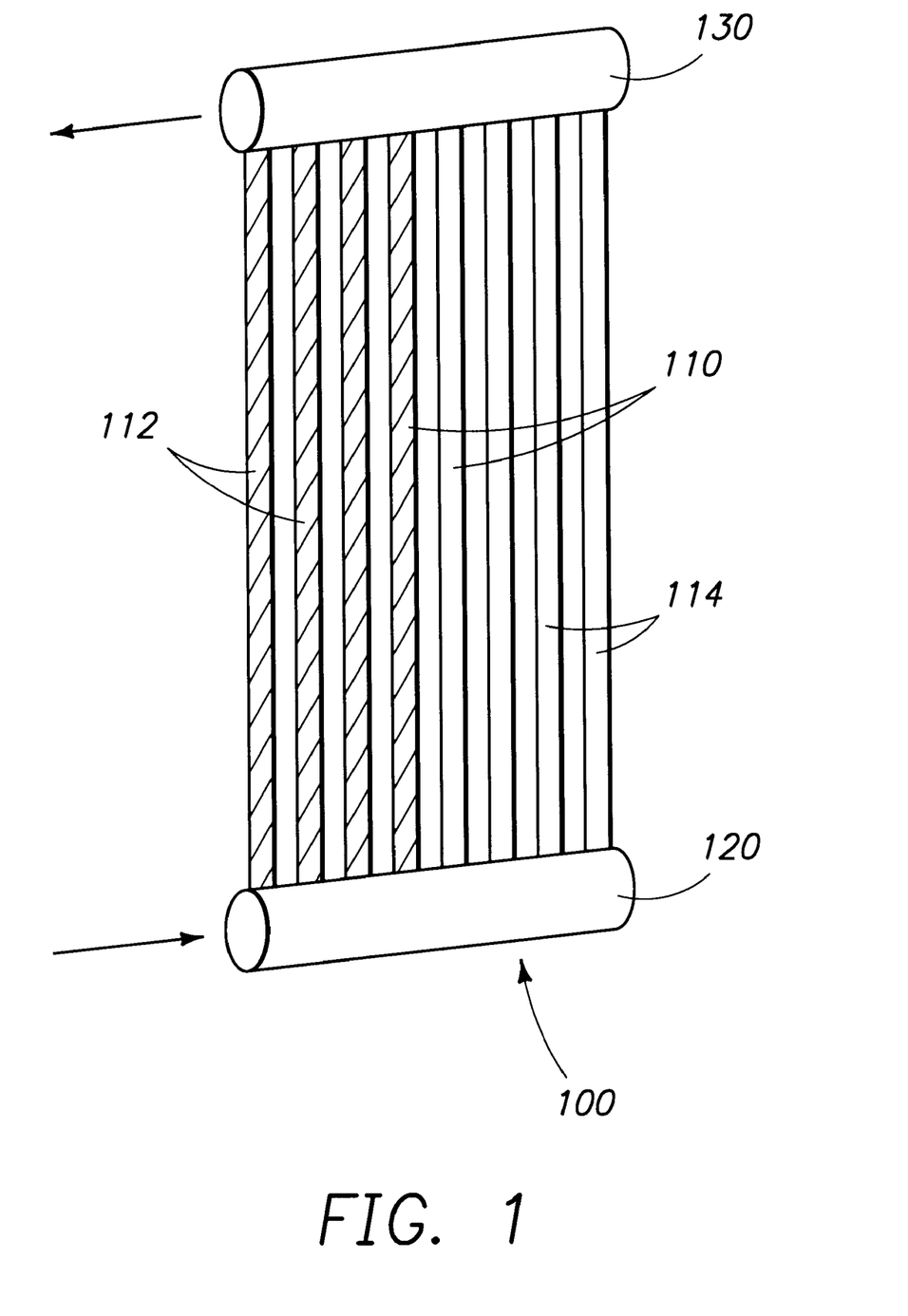
FIG. 1 illustrates an array of thermoplastic heat exchange tubes in a preferred heat exchanger of this invention that is particularly useful for heating swimming-pool water using solar energy.

In one embodiment of this invention, a heat exchanger has a plurality of polymeric heat-exchange tubes assembled in an array, wherein at least a portion of the total number of polymeric heat-exchange tubes in the array has angled heat-exchange performance-improving indentations. One preferred embodiment is shown in FIG. 1, which illustrates a heat exchanger that uses solar heat to warm swimming-pool water.

Heat exchanger 100 has an array of tubes comprising a plurality of adjacent thermoplastic heat-exchange tubes 110 that are attached at each end to separate thermoplastic pipes or headers 120 and 130 through which swimming-pool water flows. Some of tubes 110 are thermoplastic heat-exchange tubes having angled performance-improving indentations along the length of the tube (tubes 112), while some tubes may be thermoplastic heat-exchange tubes without angled performance-improving indentations (tubes 114). As water flows through thermoplastic heat-exchange tubes 110, solar energy that is collected by the tubes is conducted through the walls of the tubes and into the water. Preferably, at least substantially all of the tubes in an array have angled performance-improving indentations.

Dimensions of the tubes and the array depend on a number of factors. The diameter and number of thermoplastic heat-exchange tubes in an array are selected to supply the desired heat exchange rate to water at the desired flow rate and to have adequate wall thickness and strength and low pressure-drop. In the preferred embodiment, flow through the tubes is substantially laminar. In certain preferred embodiments for heating swimming-pool water, each thermoplastic heat-exchange tube in the array has an outer diameter of about ¼ inch, and the number of tubes in the array is such that the Reynolds number of fluid flowing through a tube in the array is less than about 2100 and usually is less than or about 300.

It is desirable to have little pressure-drop through thermoplastic heat-exchange tubes when the tubes are used to solar-heat swimming pool water, since an increased pressure drop reduces the flow rate of water pumped through the heat exchanger by a centrifugal pump and thereby reduces the total amount of heat that is absorbed by the swimming pool water. Consequently, it is desirable that the angled performance-improving indentations in thermoplastic heat-exchange tubes 112 do not increase the pressure drop through those tubes substantially. For each tube 112, the angle, depth, and length of each indentation and the distance between angled performance-improving indentations are selected to cause the amount of heat exchanged into the swimming-pool water to increase without increasing the pressure-drop through the tube by a substantial amount, as compared to the amount of heat and pressure-drop in a reference tube that is identical to tube 112 but which does not have angled performance-improving indentations.

Figure 2A:
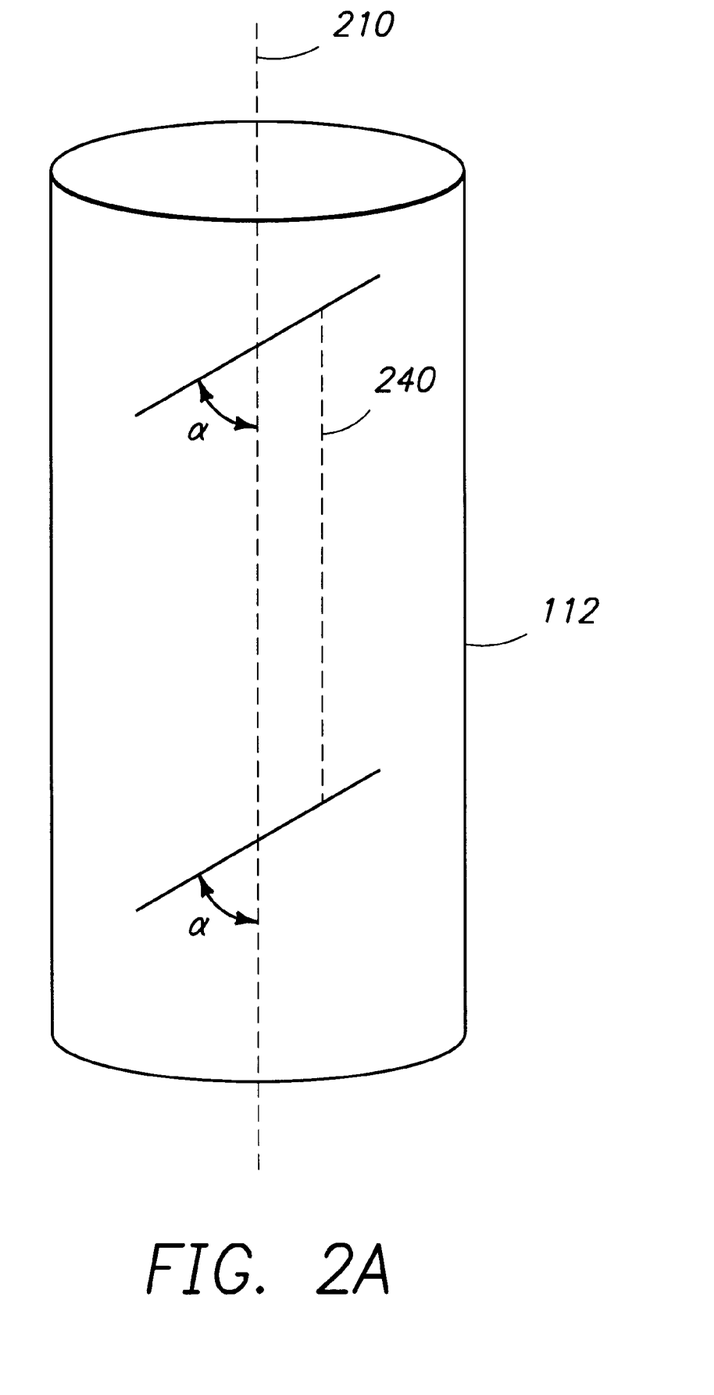
FIGS. 2a and 2b illustrate an angled performance-improving indentation forming an angle $\alpha$ or $\alpha'$ as shown that is greater than 0° and less than 90° to the tube axis when viewed from directly overhead the indentation and from the outer side of the tube.
Figure 2B:
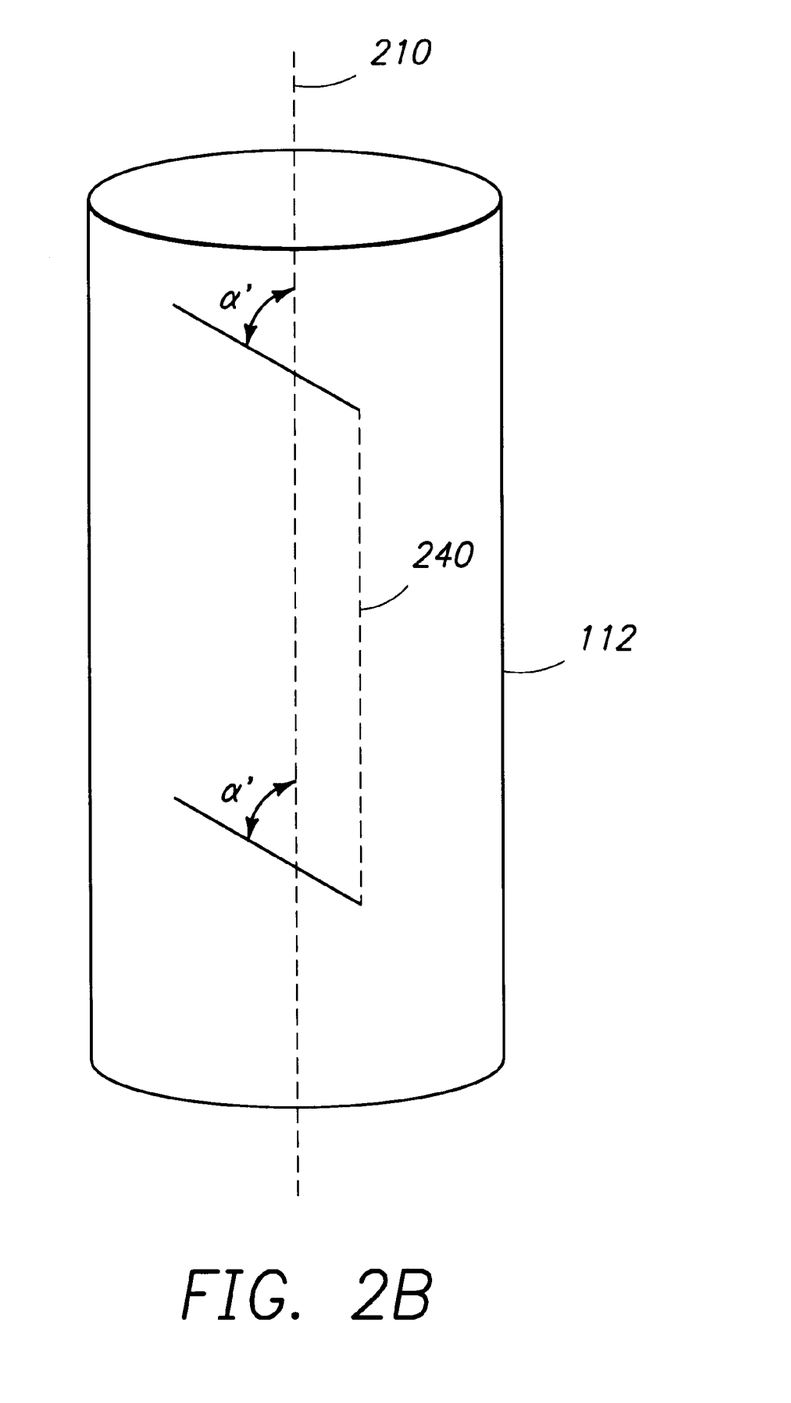

An angled performance-improving indentation forms an angle α or α' as shown in FIG. 2a and FIG. 2b that is greater than 0° and less than 90° to the tube axis when viewed from directly overhead the indentation and from the outer side of the tube. An indentation may be curved, but for ease of manufacturing, the indentation is straight. The angle α or α' is 0° when the indentation is parallel to the tube axis 210. Preferably, each indentation on a thermoplastic heat-exchange tube has approximately the same angle and direction as all other indentations present on that tube, where each indentation is viewed from the outer face of the tube in which the indentation is formed. For water, the angle α or α' of the angled performance-improving indentations is preferably greater than 10 degrees. Also, for water, the angle α or α' of the angled performance-improving indentations is preferably less than 45 degrees and more preferably is about 20 to 30 degrees for maximum performance improvement.

Figures 3, 4, 6:
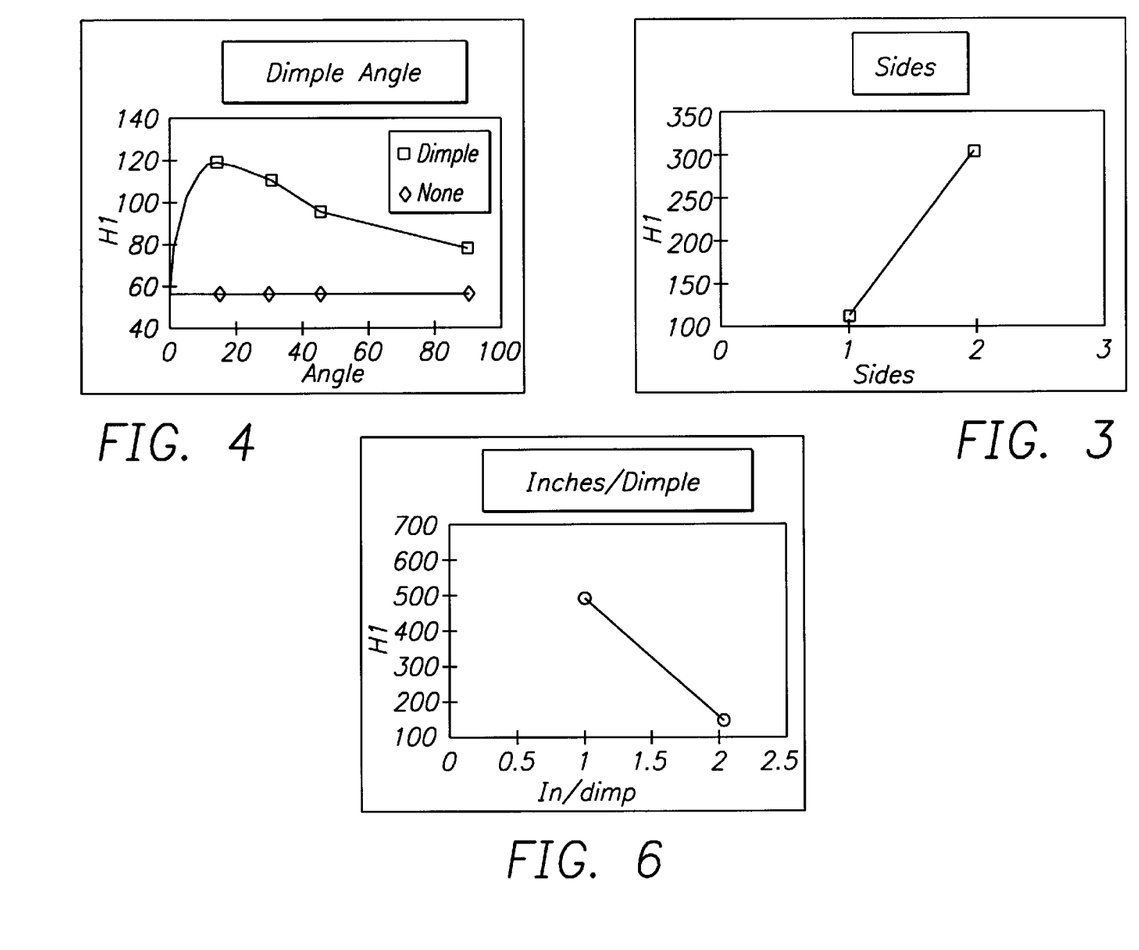
FIG. 3 illustrates the rate of heat exchange when performance-improving indentations are present on one side of a tube and when performance-improving indentations are present on opposite sides of a tube.
FIG. 4 shows the rate of heat exchange as a function of the angle of the performance-improving indentations when an aqueous solution of ethylene glycol at 70° F. flows through a ¼ inch diameter polypropylene tube at a rate of about 12 ft/min., the outer surface of which tube is at a temperature of about 90° F.
FIG. 6 shows how the spacing between consecutive indentations affects the heat exchange rate.

Preferably the thermoplastic heat exchange tube has angled performance-improving indentations on opposite faces that have the same angle, depth, and spacing as each other when each angled performance-improving indentation is viewed from overhead the angled performance-improving indentation. Thus, when viewed from one side, the angle of the hidden indentation will be the negative of the visible indentation. FIG. 3 illustrates that a heat exchanger having tubes with indentations on opposite sides of each tube and opposite each other has three times the heat exchange rate of a heat exchanger that has tubes with indentations on only one side of its tubes.

As FIG. 4 shows, the heat transfer coefficient increases markedly when a heat exchanger uses tubes having angled performance-improving indentations. The heat transfer coefficient h increases from less than 60

$$\frac{BTU}{hr\text{-}ft^2\text{-}°F.}$$

for a reference heat exchanger having no indentations to approximately 80

$$\frac{BTU}{hr\text{-}ft^2\text{-}°F.}$$

when indentations are present at an angle of 90° to the axis of flow. More surprisingly, heat transfer coefficient h increases to approximately 100 or more $$\frac{BTU}{hr\text{-}ft^2\text{-}°F.}$$

when indentations are between about 10 and 45° to the axis of flow. Consequently, instead of placing the indentations at 90° to the axis of flow, it is preferred to place the indentations at an angle between about 10 and 45° to the axis of flow to obtain a high heat transfer coefficient without significant pressure loss in the fluid flowing through the heat exchange tube.

Figure 5:
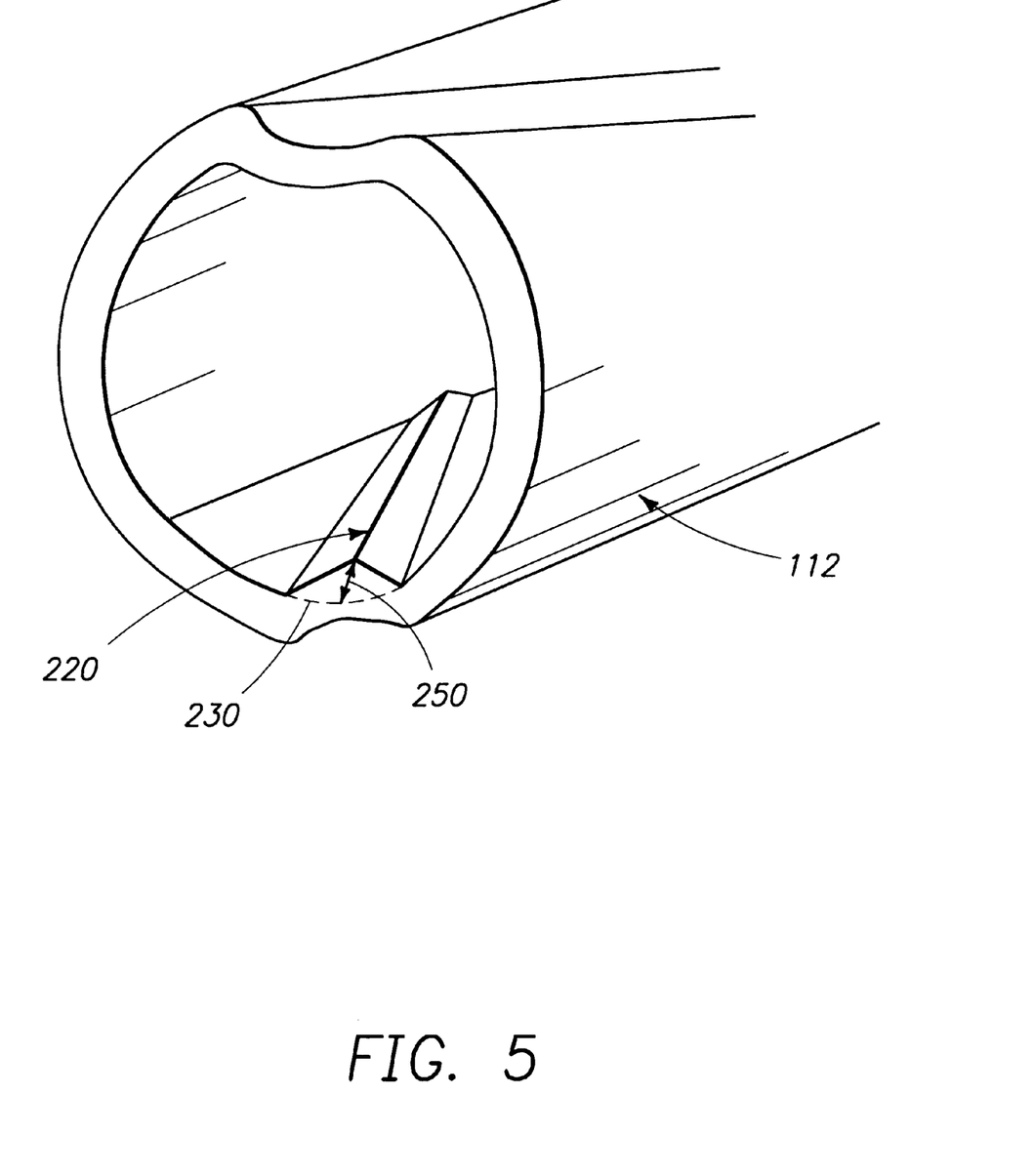
FIG. 5 illustrates a tube having angled performance-improving indentations as viewed from the open end of the tube.

The height of each angled performance-improving indentation is the greatest distance measured along a line drawn from inner tube wall portion 230 to edge 220, which line is perpendicular to a line tangent to the inner tube wall portion 230, as illustrated by line 250 in FIG. 5. Usually, the height of each angled performance-improving indentation is greater than about 10 percent of the inner diameter of tube 112. The height is usually less than 50 percent, and preferably is less than about 40 percent, of the inner diameter of tube 112. When used for solar-heating swimming pool water, the height of each angled performance-improving indentation is between about ¹⁄₃₂ in. and ¹⁄₁₆ in. for a tube having an inner diameter of about ¹³⁄₆₄ inch. Preferably, all angled performance-improving indentations on a tube are approximately the same height.

The length of each angled performance-improving indentation is the distance along the edge 220 of the indentation within thermoplastic heat-exchange tube 112. The length of each angled performance-improving indentation has essentially been established once the thermoplastic heat exchange tube inner diameter and the angle and depth of the angled performance-improving indentations have been selected. When used for solar-heating swimming pool water, the length of each angled performance-improving indentation is between about 3/16 in. and 9/16 in. for a tube having an inner diameter of about 13/64 inch. Preferably, all angled performance-improving indentations on a tube are approximately the same length.

The distance between consecutive angled performance-improving indentations is shown in FIG. 2 as the linear distance 240 from a point on one angled performance-improving indentation to a corresponding point on the next angled performance-improving indentation. The distance should be selected to give, in conjunction with the depth, angle, and length of the angled performance-improving indentation, an increase in heat exchanged into the liquid flowing through the tube. The distance between consecutive angled performance-improving indentations is usually greater than about 100 percent of the inner diameter of the thermoplastic heat exchange tube. The distance between consecutive angled performance-improving indentations is usually less than about 1000 percent, and most preferred is a distance of about 500% of the inner diameter of the heat exchange tube. A distance between about 0.25 and about 2.0 inches is preferred, and a distance of approximately ½ to 1 inch is especially preferred for a tube having an inner diameter of 13/64 inch. FIG. 6 illustrates how the spacing between consecutive indentations affects the heat exchange rate.

FIG. 6 shows that the heat transfer coefficient h can be substantially increased by placing indentations closely together. FIG. 6 shows that h was about 500

$$\frac{BTU}{hr\text{-}ft^2\text{-}°F.}$$

when indentations were spaced 1 inch apart, whereas h was about 150

$$\frac{BTU}{hr\text{-}ft^2\text{-}°F.}$$

when indentations were spaced about 2 inches apart. Substantial gains in the heat transfer coefficient and heat exchange rate can be made with small changes in the spacing between indentations.

It is theorized that the angled indentations induce heat-scavenging vortices in the volume of water immediately adjacent to the indentations. These vortices decay by momentum diffusion (i.e. viscous forces) into general rotation of water or other fluid moving within the tubes to further assist the heat-transfer process by exchanging the warmer fluid near the sunlit surface with cooler fluid on the opposite side of the tube. Despite the presence of these vortices, little pressure is lost as the fluid flows through the tubes.

The tubes are made of a plastic material in the preferred embodiment of the invention, and polyolefins such as polyethylene and polypropylene are particularly useful. The plastic material is preferably a dark or black color, especially where the plastic heat-exchange tubes are to be used in solar heating. If polyethylene is used to form a heat-exchange tube, the polyethylene preferably has an environmental stress-crack resistance of greater than 5000 hours. The tubes can also be made of a metal such as copper.

Figure 7:
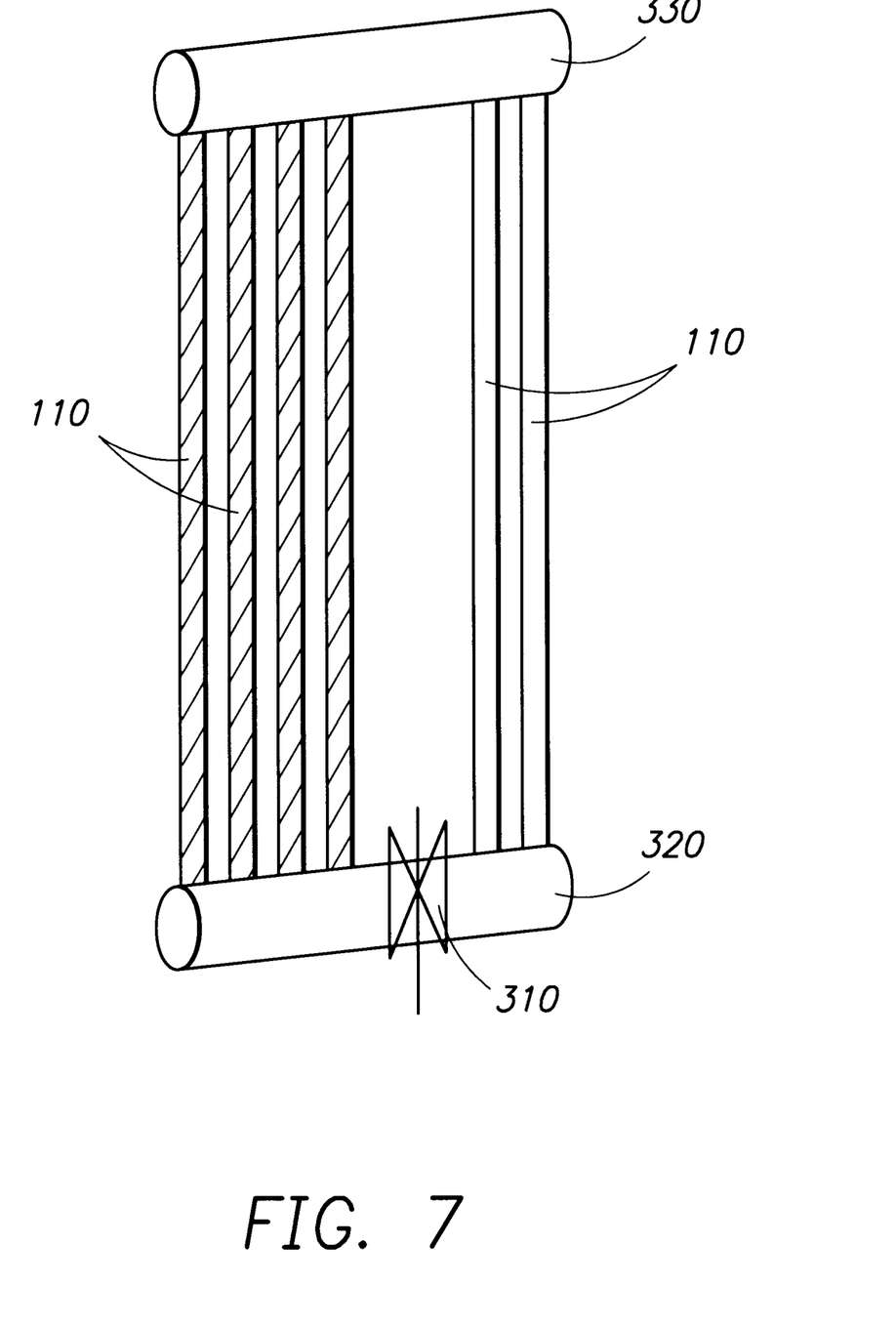
FIG. 7 illustrates a second preferred embodiment of this invention incorporating a pressure regulating valve.

FIG. 7 shows another preferred embodiment of the invention that is particularly useful for solar-heating swimming pool water. A pressure-regulating valve 310 is placed in one header 320 between two sets of thermoplastic heat-exchange tubes 110. Water is forced to flow first through one set of thermoplastic heat-exchange tubes and into header 330, and then this heated water flows through the second set of thermoplastic heat-exchange tubes and back into header 320. The pressure-regulating valve 310 is adjusted to both force water to flow in the path just described and also to minimize the back-pressure on the centrifugal pump. When the pressure across the valve exceeds a set pressure, preferably no more than about 3 psi, the valve opens and allows some water to flow directly from the inlet side of header 320 to the outlet side, bypassing the tubes. Because there is less back-pressure on the centrifugal pump, frictional losses are reduced, and pumping energy is saved. The heat exchanger is easier to install and is more pleasing aesthetically, since the water inlet and exit are located at the same elevation. Preferably, the pressure-regulating valve is located approximately midway in the header and between approximately equal numbers of thermoplastic heat exchange tubes of the heat exchanger.

Figure 8:
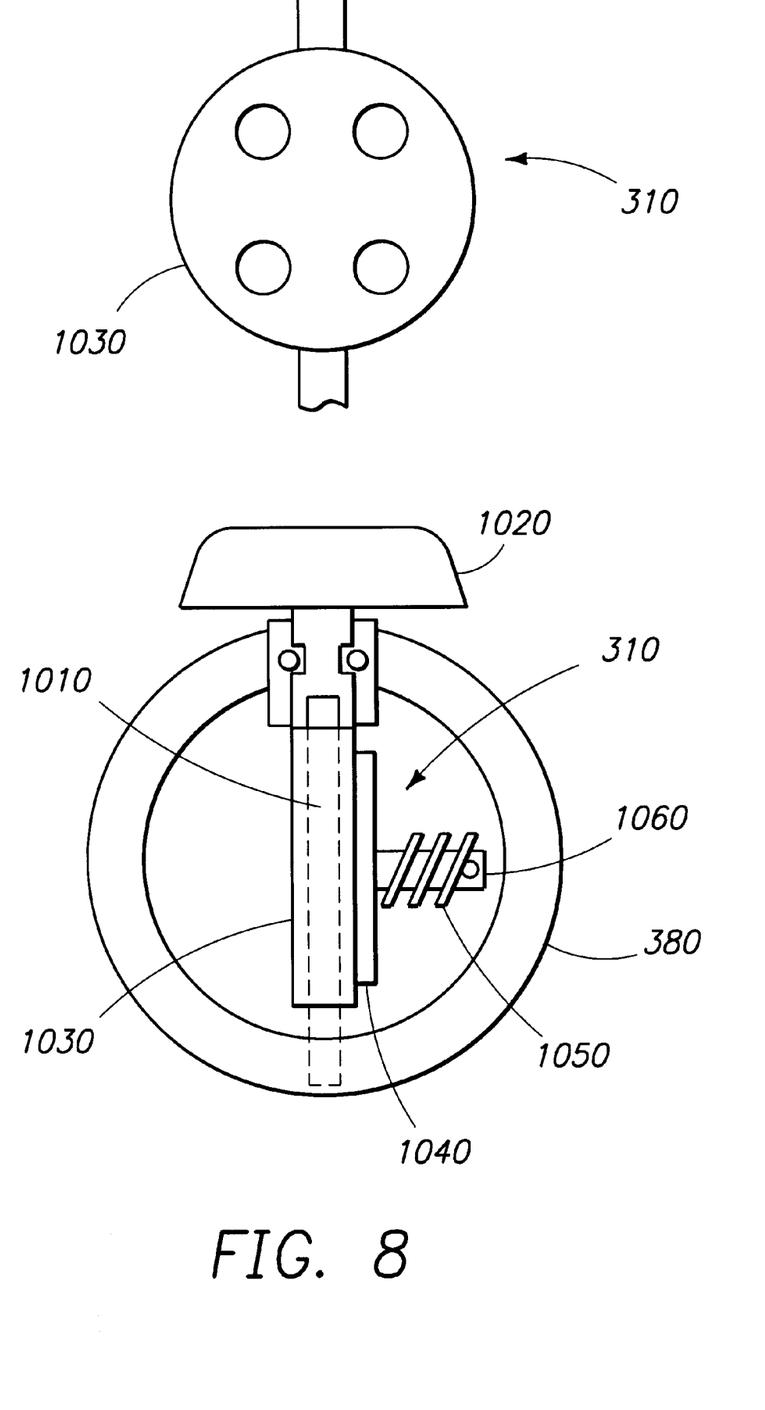
FIG. 8 illustrates a pressure-regulating valve that is used in certain preferred embodiments of the invention.

In another embodiment of the invention as illustrated in FIG. 8, the pressure-regulating valve 310 within the header 380 is mounted to a rotatable shaft 1010 that is attached to a handle 1020 on the exterior of the header. The pressure-regulating valve can be rotated from its usual position of regulating pressure to a position that allows water to flow past the valve with little restriction, thereby bypassing the heat-exchange tubes in the array. The valve is positioned in its fully-opened position at night, for instance, when it is desirable to circulate water through the filtration unit but not through the heat exchanger in order to filter the water without losing a substantial amount of heat. A perforated plate 1030 with a solid plate 1040 is held against the perforated plate by a spring 1050. The spring constant is chosen to allow the solid plate to move along shaft 1060 when the pressure against the front of the valve exceeds a selected pressure.

A thermoplastic heat exchange tube having angled performance-improving indentations can be made by determining the size, depth, angle, and spacing of angled performance-improving indentations as described above; heating an area on the tube to soften the area in which an indentation is to be formed; and pressing a die against the tube with sufficient force to form an indentation of the selected size, depth, angle, and spacing. Infrared heat lamps or heated air, for example, can be used to supply heat to the thermoplastic tube, and areas not to be heated can be masked to prevent significant heating of those areas. Areas of the tube to be indented should be heated sufficiently that the die can easily form an indentation in the tube without causing excessive stress in the material or excessive thinning of the wall cross-section. Heating should not be excessive, so that the die releases from the tube without becoming coated with the tube's polymer. It is not necessary to completely melt the tube in the vicinity where the indentation is to be made. A die having a single protrusion that forms the indentation may be used to indent a thermoplastic heat exchange tube, or a die may have multiple protrusions along its length which correspond to the angled performance-improving indentations to be formed in the thermoplastic tube. Multiple dies may be used to form indentations on more than one side of the tube. For example, dies may be placed on opposite sides of the tube to form angled performance-improving indentations on opposite sides of the tube (180° from each other), and, optionally, the tube or heater and die may be rotated 90° to place angled performance-improving indentations on the remaining sides of the tube. The heating mask or the forming dies can also be constructed on rollers or belts. Other methods of forming indentations or other angled means such as vanes or channels in the inner wall of the thermal heat exchange tube for increasing the amount of heat transferred from or to the heat exchange liquid may be used, including: (1) rotating a die within the tube as it is forming or after it has formed to create indentations or other structures in the inner wall of the thermoplastic heat exchange tube, or (2) masking the tube with a heat-resistant mask so that areas to be indented are exposed, creating a pressure differential between the interior and exterior of the tube by applying vacuum to the inside of the tubes and/or pressure to the outside of the tubes using a fluid such as air or a liquid, and heating the unmasked areas to form the indentations.

Figure 9:
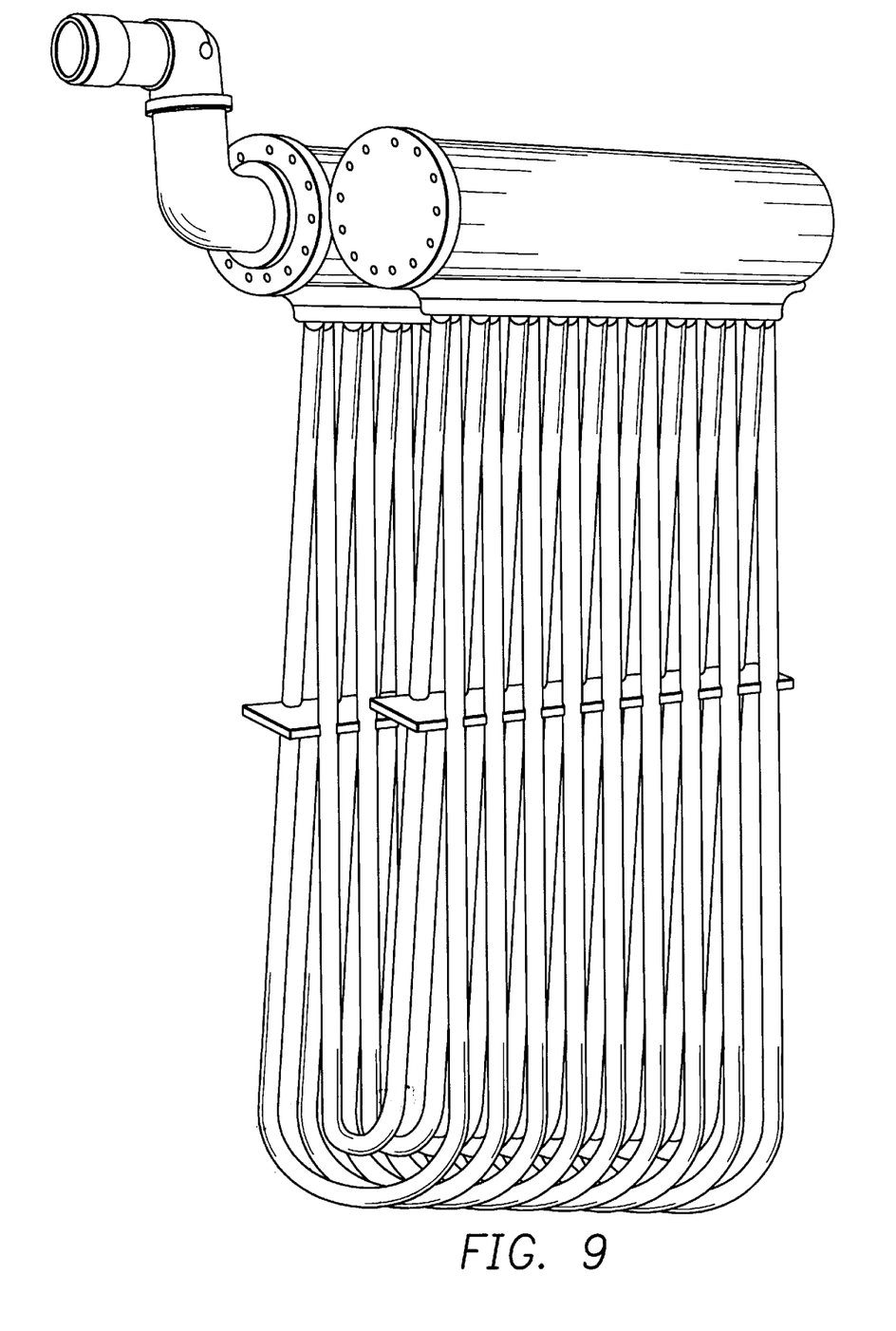
FIG. 9 illustrates a third preferred embodiment of a heat exchanger of this invention for water to water or air to water heat exchange or for thermal energy storage applications.

A heat exchanger can be formed by assembling a number of thermoplastic tubes adjacent to one anther into an array, forming the angled performance-improving indentations in the array of tubes, and attaching the array to two headers. Preferably, tubes are linear and are attached to two headers running parallel to each other, and preferably the headers are perpendicular to the tubes. Since the tubes are made of a thermoplastic material, the tubes may be bent into a U-shape as illustrated in FIG. 9 or other shapes that can be formed with tubes or an array. Preferably, the tubes in the array are substantially parallel to each other.

For ease of connecting an end of a tube to a header, the thermoplastic tube can be welded to a triangularly-shaped flange attached to the header pipe. See U.S. Pat. Nos. 3,934,323 and 4,098,331, which are incorporated by reference in their entirety herein, for one such method.

A tube, array, or heat exchanger of this invention is distinguished from other tubes and heat exchangers which utilize vanes, dents, grooves, or tinsel garland in the tubes. See, for example, U.S. Pat. Nos. 4,284,068, 4,080,703, 4,044,797, and 2,310,970, where it is noted in those patents that vanes, dents, grooves, or tinsel garland increase turbulence, increase pressure loss, and/or decrease flow of the liquid or gas passing through the tube. Similarly, U.S. Pat. Nos. 4,314,587 and 4,248,179 disclose heat exchange tubes for use in boilers that have spiraling grooves or ribbing on internal surfaces to reduce or prevent a steam vapor barrier from forming between the water and the tube's inner surface by providing turbulence at the surface of the tube. Thermoplastic tubes, arrays, or heat exchangers of preferred embodiments of this invention have angled performance-improving indentations of particular size dimensions and spacing as described herein such that heat exchange improves without causing the substantial pressure loss, turbulence, or decrease in flow noted in the above patents.

Preferably, the heat transfer coefficient h of a heat exchanger, array, or tube of this invention is greater than 200%, and more preferably the heat exchange coefficient is greater than 300% of the heat transfer coefficient for a reference heat exchanger, array, or tube, respectively, that is identical in every respect except that the reference device does not have angled performance-improving indentations. In one embodiment, a heat exchanger of this invention had an array of thermoplastic tubes having angled performance-improving indentations on opposing faces of the tubes of the array, and the angled performance-improving indentations had an angle α of 30°, a depth of 1/16 in., and a spacing between adjacent indentations of approximately 1 inch. The heat exchange coefficient h increased from approximately 60

$$\frac{BTU}{hr\text{-}ft^2\text{-}°F.}$$

for a heat exchanger with no indentations to approximately 300

$$\frac{BTU}{hr\text{-}ft^2\text{-}°F.}$$

while the pressure drop remained essentially the same for the two heat exchanger operating under identical heat exchange conditions.

A heat exchanger of this invention is also preferably used in a thermal energy storage unit. A thermal energy storage unit provides a way to shift cooling loads from peak energy-demand periods when energy cost is high to off-peak energy-demand periods, providing air conditioning for a building, for example, at lower operating cost than an air conditioning system not utilizing a thermal energy storage unit. A thermal energy storage unit is therefore part of a larger system, such as the one shown in FIG. 10, which is an air chilling system that either provides energy to the thermal energy storage unit to store for later use or which extracts the stored energy during peak energy-demand periods.

Figure 10:
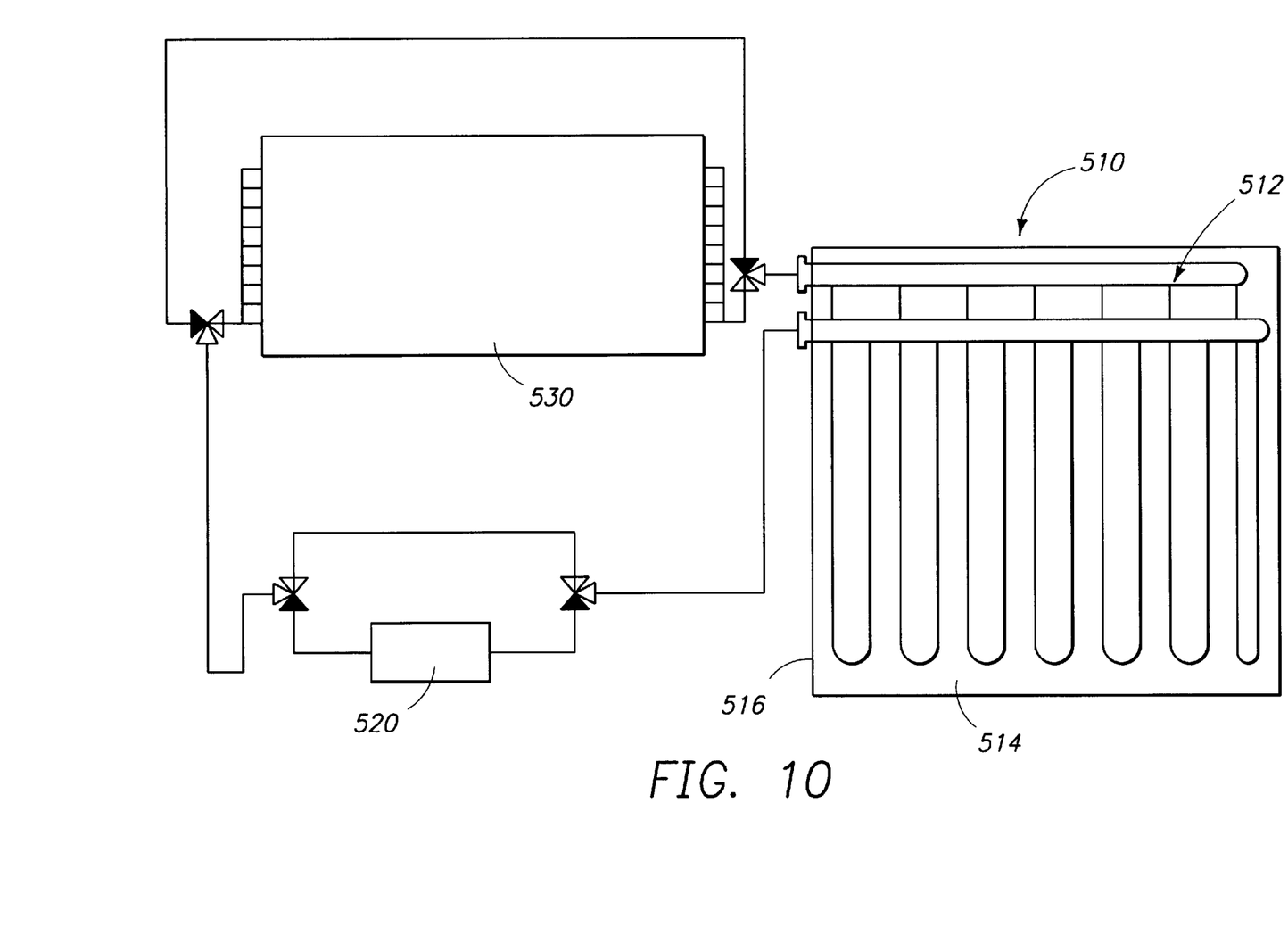
FIG. 10 is a diagram of a preferred embodiment of a thermal energy storage unit of this invention that incorporates a heat exchanger as illustrated in FIG. 9.

A thermal energy storage unit 510 as shown in FIG. 10 comprises a heat exchanger 512, a thermal energy storage medium 514, and an enclosure 516 which houses the heat exchanger and thermal energy storage medium. During off-peak energy-demand periods when the rate charged for power is low, the thermal energy storage medium 514 is cooled by pumping a heat exchange liquid through a chiller 520 and through the heat exchanger 512 within the thermal energy storage unit. The heat exchange liquid is returned to chiller 520, bypassing air cooler 530. Energy is thus stored in the thermal energy storage medium in the form of a low-temperature fluid or solid. When energy is to be extracted from the thermal energy storage unit during peak energy-demand periods, chiller 520 can be either continue to run or can be shut off and bypassed, the heat exchange liquid is pumped through heat exchanger 512, and the chilled heat exchange liquid exiting the thermal energy storage unit is then pumped through air cooler 530 to provide chilled air for use in air-conditioning a building.

The thermal energy storage medium 514 is preferably a material that undergoes a phase change when chilled. A thermal energy storage medium which undergoes a phase change stores much more energy than a medium that is merely heated or cooled to a different temperature. Preferably, the thermal energy storage medium is a liquid such as water that becomes solid when chilled by the heat exchange liquid passing through the tubes of the heat exchanger. The heat exchange liquid passing through the tubes of the heat exchanger and chilling the thermal energy storage medium should have a freezing point below the temperature at which the thermal energy storage medium changes phase. When water is used as the thermal energy storage medium, a suitable heat-exchange liquid for freezing the water is a 25% solution of ethylene glycol in water. The thermal energy storage medium is preferably agitated to increase the rate at which heat is transferred. Sufficient agitation can be supplied by bubbling air through the liquid thermal energy storage medium.

The heat exchanger preferably has a large contact area with the thermal energy storage medium. This large contact area can be provided by the tubes of the heat exchanger itself. When liquid thermal energy storage medium solidifies on the surface of the heat exchanger tubes, thermal resistance limits the amount of heat that can be transferred from the liquid portion of the thermal energy storage medium through the ice layer and tube wall and into the liquid heat exchange medium flowing through the tubes of the heat exchanger. The heat transfer resistance increases as the thickness of the ice layer on the heat exchanger's surface increases, since the heat flow path increases in length. Consequently, it is very desirable to have a heat exchanger with many closely-spaced, small-diameter heat exchange tubes dispersed throughout the thermal energy storage medium. This configuration produces shorter heat flow paths, which minimizes the resistance to heat flow.

A large number of small diameter tubes results in low velocity fluid flow in the tubes. The Reynolds number is low, causing low heat transfer coefficients.

A heat exchanger of this invention overcomes the problem of low heat transfer coefficients. Therefore, a thermal energy storage unit preferably contains a heat exchanger of this invention, as described above. A heat exchanger of this invention increases the amount of heat transferred to the heat exchange liquid flowing through its tubes, which improves energy efficiency of the system incorporating the thermal energy storage unit. As discussed above, tubes having angled performance-improving indentations increase the amount of heat transferred to or from the heat exchange liquid flowing through the tubes without increasing the pressure drop through the heat exchanger substantially over an identical heat-exchanger that does not have angled performance-improving indentations in its heat-exchange tubes.

It is important to have maximum heat transfer through thermoplastic heat-exchange tubes without significantly increasing pressure drop in a thermal energy storage unit, since a pressure drop that is higher than necessary for the heat-exchange rate desired produces a less economical operation than where the pressure drop through the tubes is minimized. Thus, in a preferred embodiment, for each tube having angled performance-improving indentations, the distance between angled performance-improving indentations and the angle, depth, and length of each indentation are selected to cause the amount of heat exchanged into or from the heat exchange liquid to increase without increasing the pressure-drop through the tube by a substantial amount, as compared to the amount of heat and pressure-drop in a reference tube that is identical to the tube of this invention but which does not have angled performance-improving indentations.

For a thermal energy storage unit, preferably the performance of a heat exchanger of this invention is at least 5 percent higher than the performance of a reference heat exchanger that is identical except for having no angled performance-improving indentations on its thermoplastic heat exchange tubes. In one embodiment, a heat exchanger of this invention used in a thermal energy storage unit had an array of polypropylene heat exchange tubes having angled performance-improving indentations on opposing faces of the tubes of the array, and the angled performance-improving indentations had an angle α of 30°, a depth of $\frac{1}{16}$ in., and a spacing between adjacent indentations of approximately 1 inch. The heat exchanger of this embodiment had approximately 5% better performance (increasing from 441 to 462 BTU of heat transferred per $ft^2$ of tube surface area per day) than a reference heat exchanger that was identical to the heat exchanger of this embodiment but with the exception that the polypropylene tubes did not have angled performance-improving indentations, indicating more heat was transferred by the heat exchanger of this invention.

Descriptions of specific designs and dimensions are provided only as examples. It is to be understood that various modifications to the preferred embodiments will be readily apparent to those skilled in the art. Thus, while preferred embodiments of the invention have been disclosed, it will be readily apparent to those skilled in the art that the invention is not limited to the disclosed embodiments but, on the contrary, is intended to cover numerous other modifications and broad equivalent arrangements that are included within the spirit and scope of the following claims.

What is claimed is:

1. A heat exchange system comprising:
a plurality of heat exchange tubes for exchanging heat between a heat source or heat sink that is external to the surfaces of the heat exchange tubes and a heat exchange liquid flowing through said heat exchange tubes, said heat exchange tubes having angled means for increasing the amount of heat transferred from or to the heat exchange liquid, wherein the angle of the angled means for increasing the amount of heat transferred is between about 15 and 45 degrees, the height of the angled means for increasing the amount of heat transferred is between about 10 and 50 percent of the diameter of the heat exchange tubes, and consecutive angled means for increasing the amount of heat transferred are spaced from each other a distance along the longitudinal axes of the heat exchange tubes of between about one-half and ten times the inner diameter of the heat exchange tubes; and two headers that individually engage opposing ends of the heat exchange tubes, wherein one header has a pressure-regulating valve installed in the header and between two portions of the heat exchange tubes of the heat exchanger, wherein the pressure-regulating valve is rotatable such that the pressure-regulating valve can be rotated from its usual position of regulating pressure to a position that allows water to flow past the valve with little restriction, thereby bypassing the heat-exchange tubes in the heat exchange system.

2. A heat exchange system, the heat exchange system comprising:
a heat exchange tube having a first end and a second end;
a first header tube, the first header tube including an opening defined along a longitudinal axis of the first header tube, wherein the first end of the heat exchange tube is substantially aligned with the opening; and
a pressure regulator, the pressure regulator including a valve arrangement, the pressure regulator being arranged at least partially within the first header tube, the pressure regulator further being arranged to regulate pressure of a heat exchange fluid flowing through the heat exchange system, wherein a first orientation of the pressure regulator is arranged to allow the heat exchange fluid to flow past the pressure regulator, the valve arrangement including a rotatable section, the rotatable section being rotatable to the first orientation that is arranged to allow the heat exchange fluid to flow past the valve arrangement, thereby bypassing the heat exchange tube.

3. A heat exchange system, the heat exchange system comprising:
a heat exchange tube having a first end and a second end;
a first header tube, the first header tube including an opening defined along a longitudinal axis of the first header tube, wherein the first end of the heat exchange tube is substantially aligned with the opening; and a pressure regulator, the pressure regulator including a valve arrangement, the pressure regulator being arranged at least partially within the first header tube, the pressure regulator further being arranged to regulate pressure of a heat exchange fluid flowing through the heat exchange system, wherein a first orientation of the pressure regulator is arranged to allow the heat exchange fluid to flow past the pressure regulator, the valve arrangement including a rotatable section, the rotatable section being rotatable to the first orientation that is arranged to allow the heat exchange fluid to flow past the valve arrangement, thereby bypassing the heat exchange tube, wherein the pressure regulator further includes a handle, the handle being coupled to the valve arrangement.

4. A heat exchange system, the heat exchange system comprising:

a heat exchange tube having a first end and a second end;

a first header tube, the first header tube including an opening defined along a longitudinal axis of the first header tube, wherein the first end of the heat exchange tube is substantially aligned with the opening; and a pressure regulator, the pressure regulator including a valve arrangement, the pressure regulator being arranged at least partially within the first header tube, the pressure regulator further being arranged to regulate pressure of a heat exchange fluid flowing through the heat exchange system, wherein a first orientation of the pressure regulator is arranged to allow the heat exchange fluid to flow past the pressure regulator, the valve arrangement including a rotatable section, the rotatable section being rotatable to the first orientation that is arranged to allow the heat exchange fluid to flow past the valve arrangement, thereby bypassing the heat exchange tube, wherein the pressure regulator further includes a handle, the handle being coupled to the valve arrangement, and wherein the handle is oriented such that the handle is at least partially exterior to the first header tube, the handle being arranged to rotate the rotatable section of the valve arrangement.

* * * * *